United States Patent [19]

Davis et al.

[11] Patent Number: 5,651,522

[45] Date of Patent: Jul. 29, 1997

[54] ADJUSTABLE CLIP MEANS FOR AIR FRESHENERS AND OTHER DEVICES

[75] Inventors: Brian T. Davis, Waterford; Stephen B. Leonard, Racine, both of Wis.

[73] Assignee: S. C. Johnson & Son, Inc., Racine, Wis.

[21] Appl. No.: 428,600

[22] Filed: Apr. 25, 1995

[51] Int. Cl.$^6$ ............................................. F16L 3/08
[52] U.S. Cl. ........................... 248/221.11; 248/231.85; 248/225.21
[58] Field of Search ................. 24/297, 590, 591, 24/663; 411/508, 509, 913; 248/231.85, 220.22, 558, 207, 309.1, 316.7, 231.8, 298.1, 224.7, 289.11, 291.1

[56] References Cited

U.S. PATENT DOCUMENTS

| | | |
|---|---|---|
| 973,731 | 10/1910 | Watkins . |
| 2,416,464 | 2/1947 | Amen ........................ 248/207 X |
| 3,964,684 | 6/1976 | Wade . |
| 4,225,539 | 9/1980 | Grants . |
| 4,840,773 | 6/1989 | Logue . |
| 5,069,416 | 12/1991 | Ennis ........................ 248/231.81 |
| 5,219,134 | 6/1993 | Morita et al. .............. 248/224.7 X |
| 5,236,760 | 8/1993 | Jinn ........................... 248/316.7 X |
| 5,322,253 | 6/1994 | Stevens ..................... 248/220.22 X |
| 5,507,460 | 4/1996 | Schneider ................... 248/73 X |

*Primary Examiner*—Terry Lee Melius
*Assistant Examiner*—Robert Pezzuto

[57] ABSTRACT

An adjustable clip having a first part (10) and a second part (20) capable of attaching an article in a variety of positions where the first part includes a back surface (14) and a first flat surface (12) at an angle with respect of about 40° to 60° with respect to back surface (14). The second in part includes clip (24) and attached to one end of clip (24) is flat surface (22) at an angle of about 20° to 50° with respect to a line parallel to the surface to be attached and (26) to rotationally connect the first part (10) to the second part (20) such that flat surfaces (12) and (22) are brought into close parallel alignment and clip (24) can be adjusted to at least two positions with respect to the back surface of the article.

5 Claims, 1 Drawing Sheet

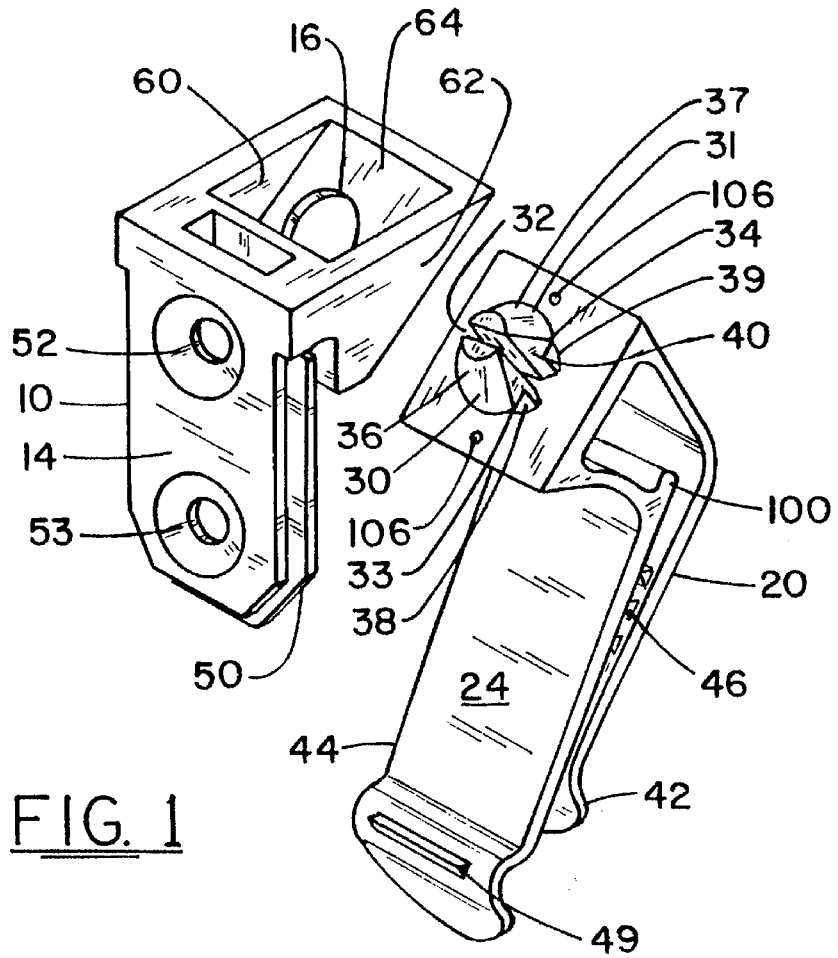
FIG. 1
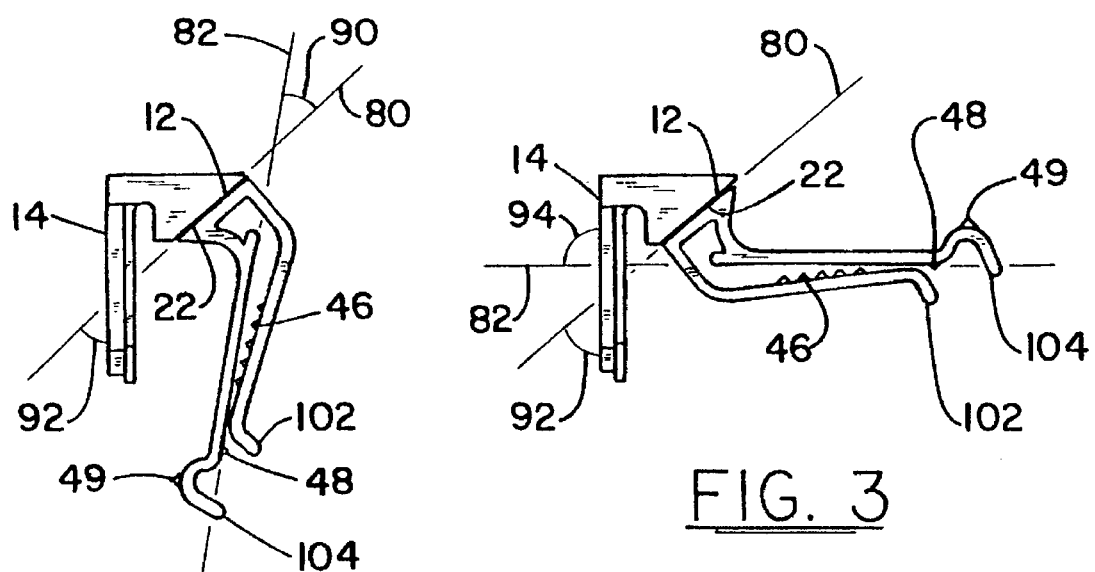
FIG. 2
FIG. 3

ADJUSTABLE CLIP MEANS FOR AIR FRESHENERS AND OTHER DEVICES

TECHNICAL FIELD

This invention relates to adjustable clips which can be adjusted in a variety of planes such that the device to be clipped or attached to a variety of surfaces can do so at varying angles.

BACKGROUND OF THE INVENTION

It has been long desired to be able to attach various articles by means of clips to a wide variety of surfaces. Typically in the past, these clipping devices have been operable in primarily one plane or dimension. In this regard, typically a device to be attached will contain an alligator or U clip. Such device can be attached to a surface such as the visor of an automobile.

In U.S. Pat. No. 4,840,773 there is disclosed a deodorant dispenser to be attached to a variety of surfaces in an automobile. This dispenser discloses a U clip which is attached by a pivot point to the back of the deodorant dispenser. This U clip is designed to be attached to a vent of the heating system of an automobile. Alternative forms of clips are described in FIGS. 2 and 3 of this patent.

U.S. Pat. No. 4,225,539 discloses a room humidifier device which is capable of being positioned in multiple positions. This device includes multiple pivot points to vary the angle of the device relative to the surface to which it is attached. In one embodiment, as shown in FIG. 3, two C shaped or U-shaped clamps are attached by a pivot point to the backing surface. However, this embodiment is capable of rotating only in one plane with regard to the axis around the pivot points.

U.S. Pat. No. 973,731 discloses an advertising or price card holder for use as an attachment to bottles and the like. This device includes two clip devices attached by a rivet or similar fastening member. There is no disclosure of any rotation of the two clips relative to fastening member 8.

U.S. Pat. No. 3,964,684 discloses an air freshening dispenser attached to a attaching means by means of an affixing member. However, there is no disclosure of this member being placed at varying angles relative to the back surface of the air freshening device.

U.S. Pat. No. 2,255,047 discloses a sachet holder having a spring clip attached to the back surface thereof.

None of the above devices are capable of affixing a device such as an air freshening device to a variety of surfaces at a variety of attitudes or planes relative to the surface to be attached. For instance, none of the above described devices would be suitable for being attached both to the visor of a car and to the grates of the venting system of an automobile.

SUMMARY OF THE INVENTION

It has therefore been found that an improved adjustable clip can be obtained for attaching an article in a variety of positions comprising a first part including means to attach to a back surface of an article to be supported and a first flat surface at an angle of about 40° to 60° with respect to the back surface of the article; a second part including clip means capable of attaching to a variety of surfaces and attached to one end of the clip means a second flat surface at an angle of about 20° to 50° with respect to a line parallel to the surface to be attached; and means to rotationally connect the first part to the second part such that the first and second flat surfaces are brought into close parallel alignment and the clip means can be adjusted to at least two positions with respect to the back surface of the article.

DETAILED DESCRIPTION OF THE DRAWINGS

FIG. 1 is a ¾ exploded view of the adjustable clip of the present invention.

FIG. 2 is a side view of the assembled clip of the preset invention in a first position.

FIG. 3 is a side view of the assembled clip of the present invention in a second position.

As shown in FIG. 1, the adjustable clip of the present invention comprises two individual parts, a first part 10 and a second part 20. First part 10 is the backing part designed to be attached to the device to be attached. Suitable devices include air freshening devices, cup holders, and the like. A suitable air freshening device is shown in FIG. 1 of design patent No. 345,787.

First part 10 has a back surface 14 and may be attached to the device to be supported by a variety of means. At least one means of attaching the first part to the device to be supported is shown in FIG. 1. The first attaching means includes a channel 50 around the periphery of back surface 14 such that channel 50 fits into a mating slot in the back surface of the device to be supported (not shown). An alternative means for attaching the first part to the device to be supported is also shown in FIG. 1 and includes first and second apertures 52 and 53 which can attach over projecting members having barbs projecting from the back surface of the device to be supported (not shown) or through which screws or bolts can affix the first part to the device to be supported. Alternatively, surface 14 can be coated with an adhesive to adhesively adhere surface 14 to a surface on the device to be supported.

The particular means of attaching the first part to the device to be supported is conventional and well known to those skilled in the art and forms no part of the present invention.

Attached to either side at the top end of back surface 14 are first and second side supports 60 and 62 which support a third side support 64. Approximately within the center of support 64 is an aperture 16 and on the opposite side of support 64 is flat surface 12 which is not visible in FIG. 1 and is visible from a side view in FIGS. 2 and 3.

Aperture 16 can either be completely circular as shown in FIG. 1 or can have a plurality of flat surfaces (not shown) spaced around aperture 16. The purpose of these flat surfaces will be described hereinafter.

Second part 20 has a second flat surface 22 attached to one end of clip means 24. As visible from FIG. 2, flat surface 22 is on an angle of approximately 20° to 50° with respect to a line parallel to the centerline of the surface to which the device is to be clipped. Line 80 shows a line in FIG. 2 and FIG. 3 shows a line parallel to surfaces 12 and 22 and line 82 is a line parallel to the centerline of the surface to be clipped.

As shown in FIGS. 1, 2 and 3, in a preferred embodiment, the clips means can be a U-shaped clip. This U-shaped clip has first flexible member 42 and second flexible member 44. These flexible members can be formed from any suitable flexible material having sufficient spring and memory retention to flex out of position and over the article to be gripped and returned to their original position. Suitable materials include steel and a variety of plastics such as acetyl, nylon, polypropylene and other materials well known to those of ordinary skill in the art.

As shown in FIG. 1, 2 and 3, the clip means can also optionally include gripping teeth 46 and 48 placed on either sides and attached to the inner surfaces of flexible members 42 and 44. In addition, the preferred clip design as shown in the drawing, the shape of clip tails 102 and 104 make it easy to insert the surface into the clip. The surface can easily wedge flexible members 42 and 44 apart by pushing upward on tail 104 and sliding over the canted surface of tail 102. In addition, tail 104 projects past centerline 82 to add further gripping strength to the clip. Extension 100 also is a preferred embodiment in that this extension prevents a small surface such as some vents in automobile heating systems from becoming canted or lodged into the area above and to the left of extension 100 in FIG. 3. Further, one or more ridges 49 can be placed on the outside of flexible members 42 and 44, to assist in gripping the surface. Gripping teeth 46 and 48 can also be placed in a variety of configurations to firmly grip a variety of differently shaped surfaces. Alternative clipping means (not shown) include spring alligator clips and other clipping devices well known to those of ordinary skill in the art.

In the approximate center of flat surface 22 is attachment means 26. Attachments means 26 includes first and second male members 31 and 32, a separation channel 32 between male members 31 and 32, a clip 34 and 35, a sloped surface 36 and 37, a collar 38 and 39, and indented surface 40 with an indented flat surface on the opposite side not shown. Collar 38 and 39 are formed by the space between flat surface 22 and lips 34 and 35. The dimension of collar 38 and 39 is approximately equal to the thickness of supporting part 64 such that when male members 31 and 32 are inserted through aperture 16, flat surface 12 and 22 are held in tight parallel relation to each other. Male members 31 and 32 and collars 38 and 39 are approximately circular such that part two can rotate relative to part one, as shown in FIGS. 2 and 3.

A preferred embodiment includes locking means to lock the adjustable clip in one of a plurality of positions. Typically at least two separate positions will be provided for.

A preferred locking means includes a plurality of small projections 106 on surface 22 and corresponding number of detents (not shown) in surface 12 such that the projections slide over the surface to lock into the detents at positions as shown in FIGS. 2 and 3 and other alternative positions. While two projections 106 are shown, this can be any number. Also, a single projection 106 could cooperate with a plurality of detents to accomplish the same result.

In an optional embodiment (not shown), indented surface 40 and the corresponding flat surface on the other side cooperate with flat surfaces spaced around the aperture 16 to form locking locations for the various positions in which the clip can be used. It is possible to have a variety of flat surfaces in aperture 16 with a similar number of indented surfaces 40 on the side of male members 30 and 31. It is possible to have two, three, four or more flat surfaces such that the device can be adjusted in a plurality of positions.

As indicated above, the angles of flat surfaces 12 and 22 with respect to back surface 14 and centerline 82 as shown in FIGS. 2 and 3 is critical to the proper functioning of the adjustable clip of the present invention. As indicated above, angle 90 which is formed by line 80 which is parallel to surface 12 and 22 and line 82 which is a line parallel to the centerline of the surface to be clipped should be within the range of from 20° to 50°. The exact angle chosen will depend on the specific design of the clipping device and the desired attitude for back surface 14 in the position as shown in FIG. 2. For instance, in a device to be clipped to an automobile visor, it is thought advisable to have some angle between the centerline of the visor and the back surface of the device. It is possible however that for some applications these lines may also be roughly parallel. For the specific clip design as shown in the attached drawing, it is preferred that the angle 90 be from 25° to 45° and it is most preferred that it be from 35° to 45°.

The second angle which is important to the proper functioning of the clip device of the present invention is angle 92 which is the angle between line 80 and back surface 14. Again, this angle will vary somewhat based on the specifics of the clip design chosen but for the clip design as illustrated in Figures attached to this application, angle 92 should be within the range of from 40° to 60°. It is preferable that this angle be in the range of from 45° to 55° and most preferred that it be within the range of 47.5° to 52.5°.

By careful choice of angles 90 and 92 and the design of the clipping means, it is possible to orient the clip relative to back surface 14 in a variety of attitudes as shown in FIGS. 2 and 3. In this regard, in FIG. 3, angle 94 which is the angle between line 82 and back surface 14 is approximately 90°, which is preferred.

Industrial Applicability

The clip of the present invention can be used for a variety of purposes. A preferred use of this clip device is for attaching air fresheners and other similar automobile accessories to alternatively automobile visors and heater vent means.

We claim:

1. An adjustable clip for attaching an article in a variety of surfaces at varying angles which comprises:
    a. a first part including means to attach to a back surface of the article to be supported, and a first flat surface at an angle of about 40° to 60° with respect to the back surface of the article;
    b. a second part including clip means capable of attaching to the variety of surfaces, and attached to one end of the clip means a second flat surface at an angle of about 20° to 50° with respect to a line parallel to the centerline of the surface to be attached; and
    c. means to rotationally connect the first part to the second part such that the first and second flat surfaces are brought into close parallel alignment and the clip means can be adjusted to at least two positions with respect to the back surface of the article.

2. The clip of claim 1 wherein the clip includes means to lock the clip means in at least two predetermined positions.

3. The clip of claim 2 wherein the locking means comprises a plurality of protrusions in the first flat surface and a corresponding number of detents in the second flat surface.

4. The clip of claim 1 wherein the first of flat surface is at an angle of about 45° to 55° with respect to the back surface of the article and the second flat surface is at an angle of about 25° to 45° with respect to the line parallel to the centerline of the surface to be attached.

5. The clip of claim 1 wherein the first flat surface is at an angle of about 47.5° to 52.5° with respect to the back surface of the article and the second flat surface is at an angle of about 25° to 45° with respect to the line parallel to the centerline of the surface to be attached.

* * * * *

UNITED STATES PATENT AND TRADEMARK OFFICE
CERTIFICATE OF CORRECTION

PATENT NO. : 5,651,522
DATED : Jul. 29, 1997
INVENTOR(S) : Brian T. Davis et al.

It is certified that error appears in the above-identified patent and that said Letters Patent is hereby corrected as shown below:

On the title page:

In the Abstract:

Line 8, after the word "and" add the word -- connector --.

Signed and Sealed this

Twenty-first Day of October 1997

Attest:

BRUCE LEHMAN

Attesting Officer

Commissioner of Patents and Trademarks